United States Patent

Fang et al.

[11] Patent Number: 5,771,318
[45] Date of Patent: Jun. 23, 1998

[54] ADAPTIVE EDGE-PRESERVING SMOOTHING FILTER

[75] Inventors: Ming Fang, Cranbury; Jianzhong Qian, Princeton Junction, both of N.J.

[73] Assignee: Siemens Corporate Research, Inc., Princeton, N.J.

[21] Appl. No.: 672,194

[22] Filed: Jun. 27, 1996

[51] Int. Cl.⁶ .................................................. G06T 5/00
[52] U.S. Cl. ......................... 382/261; 382/264; 382/269
[58] Field of Search ................................... 382/261, 264, 382/260, 266, 269, 254; 358/463, 447

[56] References Cited

U.S. PATENT DOCUMENTS

| | | | |
|---|---|---|---|
| 5,271,064 | 12/1993 | Dhawan et al. | 382/266 |
| 5,602,934 | 2/1997 | Li et al. | 382/260 |

*Primary Examiner*—Scott Rogers
*Attorney, Agent, or Firm*—Donald B. Paschburg

[57] ABSTRACT

An adaptive edge-preserving smoothing filter effectively reduces noise levels while preserving fine structures in data. The behavior of the filter is controlled easily by two control parameters. To adaptively control the behavior of the filter, the control parameter, $\alpha$, can be set as a function of the local directional variances. The control parameter, $\beta$, can be set as a function of all of the directional variances and directional means. The filter includes; a compute means which receives the filter window size, the number of filter directions and input data, adaptive weighting parameter map means which receives the control parameter, $\alpha$, adaptive weighting process means, adaptive combination parameter map means which receives the control parameter, $\beta$, and final compute means which provides the filtered output data.

20 Claims, 2 Drawing Sheets

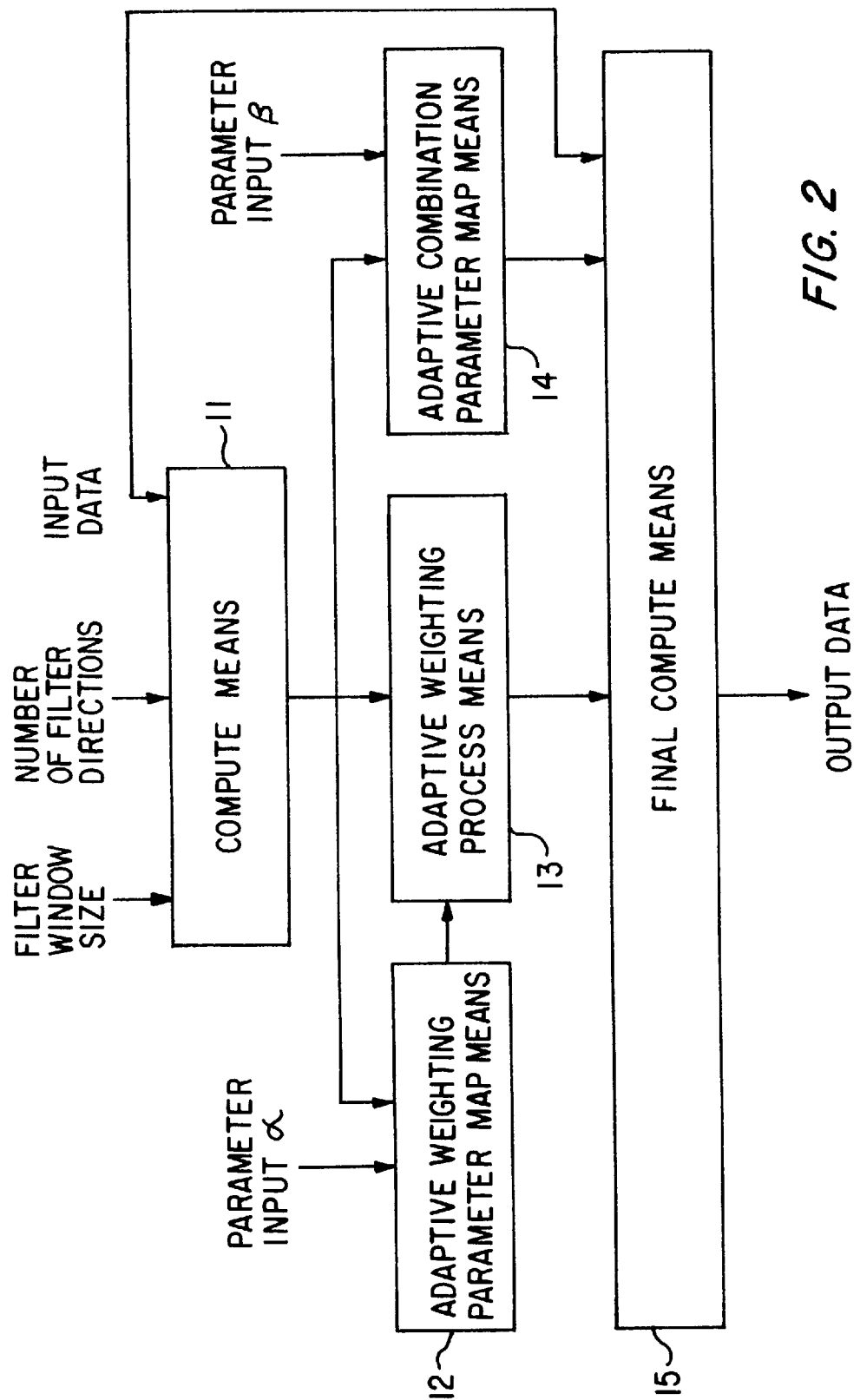

ADAPTIVE EDGE-PRESERVING SMOOTHING FILTER

BACKGROUND OF THE INVENTION

1. Field of the Invention

The present invention relates to reducing noise levels while preserving fine structures in data and more particularly to controlling the reduction of the noise levels with control parameters.

2. Description of the Prior Art

Data enhancement systems are widely used to improve the quality of data or to serve as a preprocessor for further data processing. One of the main difficulties for designing a data enhancement system is how to limit the noise amplification caused by the enhancement system.

There are many existing data enhancement systems or smoothing filters within the prior art. Consider the observation equation given by:

$$y(i,j)=f(i,j)+n(i,j) \quad (1)$$

where an image, f(i,j), is degraded by additive white noise, n(i,j). The noise is assumed to be zero-mean and uncorrelated with f(i,j).

By modeling an image, f(i,j), as consisting of a nonstationary mean component and nonstationary white fluctuation about the mean, the linear least square error estimate of f(i,j) can be written as:

$$f(i,j)=(\sigma_f^2(i,j)/\sigma_y^2(i,j))[y(i,j)-E[y(i,j)]]+E[f(i,j)] \quad (2)$$

where y(i,j), f(i,j), $\sigma_y^2(i,j)$ and $\sigma_f^2(i,j)$ are the ensemble means and variances of y(i,j) and f(i,j), respectively. If the ensemble statistics are replaced by local statistics in the above equation, the following equation of the local linear least square error estimate of f(i,j) is derived:

$$g(i,j)=(\sigma_f^2(i,j)/(\sigma_f^2(i,j)+\sigma_n^2(i,j)))[y(i,j)-m_y(i,j)]+m_y(i,j) \quad (3)$$

where $m_y(i,j)$ and $\sigma_f^2(i,j)$ are the a priori local mean and variance of g(i,j). Respectively, $\sigma_n^2(i,j)$ is the local noise variance and $m_y(i,j)$ represents the mean of y(i,j). The variance of the observation $\sigma_y^2(i,j)$ is the sum of the variances of signal $\sigma_f^2(i,j)$ and noise $\sigma_n^2(i,j)$.

In general, the local mean and variance can be estimated by local statistics. Obviously, the selection of the local window and the method used for calculating the local statistics affect the final quality of the restored image.

The following will discuss some noise smoothing algorithms that use local statistics. For simplification, only the key components of the algorithms are shown. Detailed information about the algorithms can be found in the cited references. A comparison of these algorithms can be found in S. S. Jiang and A. A. Sawchuk, "Noise updating repeated Wiener filter and other adaptive noise smoothing filters using local image statistics", Applied Optics, vol. 25, pp. 2326–2337, 1986.

In J. S. Lee, "Digital image enhancement and noise filtering by use of local statistics", IEEE Trans. Pattern Anal. Machine Intell., PAMI-2, 1980, Lee used a (2m+1)(2n+1) 2D window to calculate the local statistics. The local mean of the observation is determined by the average value of the intensity within this local 2D window:

$$m_y(i,j) = (1/(2m+1)(2n+1)) \sum_{k=i-m}^{i+m} \sum_{l=j-n}^{j+n} y(k,l) \quad (4)$$

And the local variance is $$\sigma(i,j) = (1/(2m+1)(2n+1)) \sum_{k=i-m}^{i+m} \sum_{l=j-n}^{j+n} [y(k,l)-m_y(i,j)]^2 \quad (5)$$

Lee's smoothing filter is adaptive to the local statistics in an image, however, it is an isotropic adaptive filter which can not remove noise in the edge region effectively.

D. K. Kuan, A. A. Sawchuk, T. C. Strand, and P. Chavel in "Adaptive noise smoothing filter for image with signal-dependent noise," IEEE Trans. Pattern Anal. Machine Intell., PAMI-7, 1985, presented a similar adaptive smoothing filter by using a 2D window for calculating the local statistics. In their formulation, the local mean estimation is the same as used in Lee's work. However, he extended the formulation for calculating the local variance by adding a weighting factor as follows.

$$\sigma(i,j) = \quad (6)$$
$$(1/(2m+1)(2n+1)) \sum_{k=i-m}^{i+m} \sum_{l=j-n}^{j+n} w(i-k,j-l)[y(k,l)-m_y(i,j)]^2$$

The weighting factor has the following effects. The pixels closer to the central pixel of the local window will have more influence on the local variance estimation than those pixels far away from the central pixel. A Gaussian shaped weighting window was suggested in Kuan, et. al. Certainly, the formulation of the weighted local window is very general. Selection of a suitable weighting matrix is crucial to success of this method. The weighting matrix is not necessarily isotropic. Hence, it is possible to incorporate the directional information in this formulation.

An explicitly directional approach was proposed by P. C. Chan and J. S. Lim in "One-dimensional processing for adaptive image restoration," in Proceedings IEEE, ICASSP, pp. 37.3.1–37.3.4, 1984. They discussed a 1D approach for the estimation of local statistics. The approach involves a cascade of four 1D adaptive filters oriented in the four major directions of the image, i.e., 0 degrees, 45 degrees, 90 degrees and 135 degrees, respectively. Noise filtering can be done by cascading the four filters as if the image was a 1D signal for each of the filters. The filtered image is then given by $$g(i,j)=G_4[G_3[G_2[G_1[y(i,j)]]]] \quad (7)$$

The idea behind the cascaded 1D filter is the following. A sharp edge inclined at a large angle to the filter direction would remain practically un-smoothed, while the noise at the edge region would be removed by the directional 1D filter whose orientation is close to the edge direction.

S. S. Jiang and A. A. Sawchuk in "Noise updating repeated Wiener filter and other adaptive noise smoothing filters using local image statistics," Applied Optics, vol. 25, pp. 2326–2337, 1986, modified the adaptive 1D filter described above and proposed a Quad-Window method. The same estimation method was used for the local mean as used in the 2D case. Also, the local variances were computed in four directions as proposed by Chan and Lim. However, instead of using the cascading structure, the minimum of the four directional local variances was used as the correct local variance.

$$\sigma_y(i,j)=\min\{\sigma_{y1}(i,j)+\sigma_{y2}(i,j)+\sigma_{y3}(i,j)+\sigma_{y4}(i,j)\} \quad (8)$$

This nonlinear directional filter preserves edges very well while removing noise in the edge region. In the presence of an edge structure, the filter automatically uses the variance along the edge direction, since the filter directions inclining at larger angles with the edge direction usually result in greater local variances. However, this nonlinear filter does cause artifacts in the filtered image, if the image is very noisy and the noise is not totally uncorrelated.

SUMMARY OF THE INVENTION

An adaptive edge-preserving smoothing filter effectively reduces noise levels while preserving fine structures in data. The behavior of the filter is controlled easily by two newly introduced control parameters. To adaptively control the behavior of the filter, the control parameter, $\alpha$, can be set as a function of the local directional variances. The control parameter, $\beta$, can be set as a function of all of the directional variances and directional means.

This filter directly combines the directional means and variances in K directions and utilizes the control parameters, $\alpha$ and $\beta$, to perform the smoothing in the following manner:

$$g(i,j) = f(i,j)(1 - \beta(\sigma_{min})) + \beta(\sigma_{min})\left(\left(\sum_{k=1}^{K}(m_k(i,j)/(\sigma_k^2)^\alpha)\right) / \left(\sum_{k=1}^{K}(1/\sigma_k^2)^\alpha\right)\right)$$

where m(i,j) is the a priori local mean and $\sigma^2$ is the a priori local variance of g(i,j).

The filter includes a compute means which receives the filter window size, the number of filter directions and input data, adaptive weighting parameter map means, adaptive weighting process means, adaptive combination parameter map means and final compute means which provides the filtered output data.

BRIEF DESCRIPTION OF THE DRAWINGS

FIG. 2 is a signal flow diagram of one embodiment of the present invention.

DETAILED DESCRIPTION OF THE INVENTION

Figure 1:
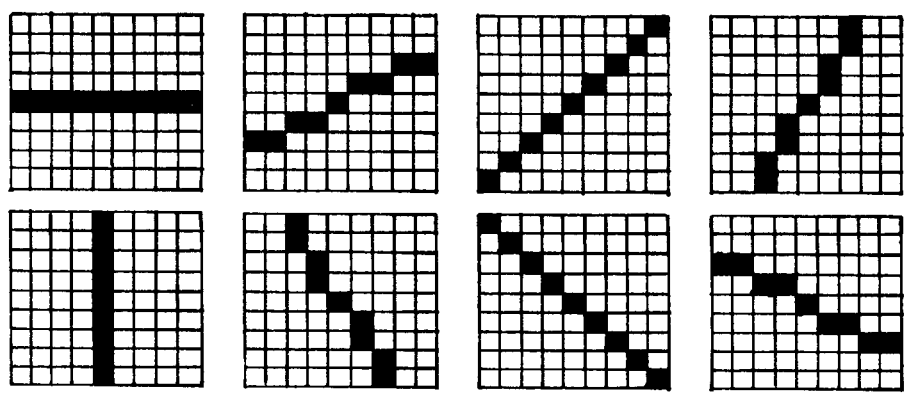
FIG. 1 is an example of eight directional 1D filters for a quadrate window with 9×9 pixels.

The following will describe an adaptive edge-preserving filter developed as a smoothness constraint for an iterative PET image reconstruction scheme. This filter provides the foundation for the adaptive edge-preserving smoothing filter of the present invention.

For PET image reconstruction, an adaptive edge preserving filter has been developed which is based on 1D directional filters. The key advantages of this filter, as with the filter of the present invention, are the following:

1. It does not involve "hard" decision making (such as using the minimum of directional variances like Jiang and Sawchuck). "Hard" decision making typically leads to patchy artifacts in the image.

2. It does not involve cascading of 1D filters (like Chan and Lim). Cascading increases the number of iterations required for reconstruction.

3. It uses directional variances to appropriately weight the directional means.

For a given quadrate local window with (2m+1)(2m+1) pixels and four filter directions, the local directional means can be calculated as follows.

$$m_{y1}(i,j) = (1/(2m+1))\sum_{k=-m}^{m} y(i+k,j) \quad (9.1)$$

$$m_{y2}(i,j) = (1/(2m+1))\sum_{k=-m}^{m} y(i+k,j+k) \quad (9.2)$$

$$m_{y3}(i,j) = (1/(2m+1))\sum_{k=-m}^{m} y(i,j+k) \quad (9.3)$$

$$m_{y4}(i,j) = (1/(2m+1))\sum_{k=-m}^{m} y(i+k,j-k) \quad (9.4)$$

The local directional variances can be calculated as follows.

$$\sigma_{y1}(i,j) = (1/(2m+1))\sum_{k=-m}^{m}[y(i+k,j) - m_{y1}(i,j)]^2 \quad (10.1)$$

$$\sigma_{y2}(i,j) = (1/(2m+1))\sum_{k=-m}^{m}[y(i+k,j+k) - m_{y2}(i,j)]^2 \quad (10.2)$$

$$\sigma_{y3}(i,j) = (1/(2m+1))\sum_{k=-m}^{m}[y(i,j+k) - m_{y3}(i,j)]^2 \quad (10.3)$$

$$\sigma_{y4}(i,j) = (1/(2m+1))\sum_{k=-m}^{m}[y(i+k,j-k) - m_{y4}(i,j)]^2 \quad (10.4)$$

The equations above are given only for four directions and a quadrate window. However, the 1D directional filter concept is valid also for non-quadrate windows and for more directions. In fact, for a relatively large window size, say 9 by 9, eight directions may be more appropriate than four directions, since the gaps between four 1D directional filters might be too large to capture some edge directions. In general, a larger window means better directional resolution. Hence, more directions are needed for a larger window. An example of eight 1D directional filters for a quadrate window with 9×9 pixels is shown in FIG. 1.

This filter directly combines the directional means and variances in K directions to perform the smoothing in the following manner:

$$g(i,j) = \left(\sum_{k=1}^{K}(m_k(i,j)/\sigma_k^2)\right) / \left(\sum_{k=1}^{K}(1/\sigma_k^2)\right) \quad (11)$$

where m(i,j) is the a priori local mean and $\sigma^2$ is the a priori local variance of g(i,j).

The basic idea behind this filter is very simple. Instead of averaging the means from all directions, a weighted averaging is performed. Since the weighting factor is $1/\sigma_k^2$, those directional means whose local directional variances are large will have a smaller contribution to the final estimate. Usually, at an edge region, the directional filter whose direction is similar to the edge, will have a small directional variance. Therefore, the filter described by (11) is adaptive to edge directions. In a flat region of the image where all local directional variances are comparable, the final output of the filter will be an average of the local directional means. This corresponds to an isotropic smoothing filter.

If an edge in an image has an orientation that is different from any of the directions of the 1D filter, this edge will be blurred to some degree. This effect is very small for filters with only four directions (such as a small filter window of 3 by 3 pixels), since four directions are enough to cover all pixels in this local window.

The basic idea of the new adaptive edge-preserving smoothing filter of the present invention follows. The adaptive edge-preserving filter of the present invention is based on the previous filter, but the new filter offers more advantages and flexibility than the original filter by introducing two new control parameters. These two control parameters eliminate two limitations of the previous edge-preserving filter. The first limitation of the old filter is that its adaptive behavior is not controllable. It is, for example, not possible for the user to control how strong the filter should be adaptive to the local directional variances. The second limitation of the original filter is that it always outputs the weighted directional (smoothed) mean value, which is desirable for most but not all applications.

For the adaptive edge-preserving smoothing filter of the present invention, equation (11) is rewritten to add the first control parameter a to the filter, as follows:

$$g(i,j) = \left( \sum_{k=1}^{K} (m_k(i,j)/(\sigma_k^2)^\alpha) \right) / \left( \sum_{k=1}^{K} (1/\sigma_k^2)^\alpha \right)$$

As can be seen directly from the equation above, by introducing the new control parameter, $\alpha$, the filter's behavior can very easily be controlled. For $\alpha=1.0$, the filter behaves the same as the original edge-preserving filter. However, if $\alpha$ is set to 0, ($\alpha=0$), then the filter becomes an isotropic filter, since the weighting factor is no longer dependent on the directional variances. All of the directional means will contribute the same weight to the final estimate. This represents the behavior of an isotropic filter. On the other hand, if $\alpha$ is set to $\infty$, ($\alpha=\infty$), the filter becomes a non-linear filter which selects only the directional mean with the smallest directional variance as the filter output. For the alpha value falling between 0 and infinity, the filter outputs automatically a weighted average value from the directional means. The weighting factor ensures that the directional mean with the smallest directional variance will always contribute the greatest amount of signal to the final filter output. The behavior of the filter can easily be adjusted from isotropic to non-linear through the use of the powerful control parameter, $\alpha$.

To adaptively control the behavior of the filter, one can set the control parameter, $\alpha$, as a function of the directional variances, $\sigma_k$. One can, for example, set a function that has a large value of $\alpha$ if the difference between the maximum and the minimum directional variance is large. This will provide a filter which is more edge-selective. One can certainly also define some other mapping functions to adaptively steer the behavior of the filter. This will make the filter more adaptive to the local statistics of the data.

The filter having control parameter $\alpha$ is now more adaptive, however it will always produce some smoothing effect no matter which $\alpha$ value is used. This implies a severe limitation if the Signal-to-Noise Ratio (S/N ratio) is varying over an image or if a particular part of signal should not be smoothed at all. Sometimes, due to a particular image acquisition scheme, such as a MR image acquired by using surface coils, an image may have a very nonuniform S/N ratio across the whole image. In this case, a S/N ratio dependent smoothing filter is very desirable. To this end, a second modification to the original adaptive edge-preserving filter is required. A second control parameter, $\beta$, is added and the equation is rewritten as follows:

$$g(i,j) = f(i,j) (1 - \beta(\sigma_{min})) +$$

$$\beta(\sigma_{min}) \left( \left( \sum_{k=1}^{K} (m_k(i,j)/(\sigma_k^2)^\alpha) \right) / \left( \sum_{k=1}^{K} (1/\sigma_k^2)^\alpha \right) \right)$$

In the equation above, the control parameter $\beta$ is a function of the minimum directional variance. $\beta$ has a data range between 0 and 1. As an example, a mapping function can be set which maps a large $\sigma_{min}$ to a large $\beta$ value. In this case, the filter of the present invention will produce a more smoothing effect if the minimum of the local directional variance is large. More generally, the control parameter $\beta$ can be written as a function of all of the directional variances and directional means.

$$\beta=\beta(\sigma_1,\sigma_2,\sigma_3,\ldots,\sigma_K,m_1,m_2,m_3,\ldots,m_K)$$

In fact, one can even set the control parameter $\beta$ as a function of other parameters and other mapping functions to achieve other desirable effects depending on the specific needs. Therefore, the above equation actually defines a class of filters with user defined functions of $\beta$ and $\alpha$.

A signal flow diagram of the present invention is illustrated in FIG. 2. Besides the input data, the filter window size and the number of filter directions are inputted to compute means 11. Within compute means 11 the directional mean values and corresponding variances for all directions are computed. One possible measure of variance could be standard deviation. The output of compute means is sent to adaptive weighting parameter map means 12, adaptive weighting process means 13 and adaptive combination parameter map means 14.

The constant weighting parameter, $\alpha$, is inputted by the user to adaptive weighting parameter map means 12 to influence the adaptive weighting process. As an alternative, an adaptive weighting parameter map, $\alpha\_map$, can be computed from the local directional means and variances obtained from compute means 11. The weighting parameter, $\alpha$, or map, $\alpha\_map$, can significantly change the behavior of the filter of the present invention. For every small alpha, the filter acts like an isotropic smoothing filter. For every large alpha, the filter acts like an isotropic nonlinear smoothing filter.

The output of adaptive weighting parameter map means 12 is sent to adaptive weighting process means 13 which also receives an input from compute means 11. Adaptive weighting process means 13 combines all of the directional means with their variances as weighting factors to form filtered data in which the local directional means with the smaller variances always have the greater contribution. This is because the weighting factor is $1/\sigma$. The output of adaptive weighting process means, the filtered data, is sent to final compute means 15.

The constant combination parameter, $\beta$, is inputted by the user to adaptive combination parameter map means 14, to control the combination process. As an alternative, an adaptive combination parameter map, $\beta\_map$, can be generated from the local directional means and variances obtained from compute means 11. The output of adaptive combination parameter map means is sent to final compute means 15.

Final compute means 15 receives an input from adaptive weighting process means 13, adaptive combination parameter map means 14 and input data. Within final compute means 15, a combination process is performed to adaptively combine the input data and the filtered data from adaptive weighting process means 13 depending on the value of the combination parameter, $\beta$, or the adaptive combination parameter map $\beta\_map$, obtained from adaptive combination parameter map means 14. Final compute means 15 provides the possibility to control the degree of the smoothing. This adaptive combination parameter map allows the user to selectively smooth some data regions with given local intensity distributions (local directional means and variances) while keeping some other areas untouched. The results of final compute means 15 is the output data.

The adaptive edge-preserving smoothing filter of the present invention was developed as part of dynamic range remapping and vessel image enhancement algorithms for enhancing x-ray and Angiography images. The present invention is, however, very general, and can be used for other types of data.

It is not intended that this invention be limited to the hardware or software arrangement, or operational procedures shown disclosed. This invention includes all of the alterations and variations thereto as encompassed within the scope of the claims as follows.

We claim:

1. An adaptive edge-preserving smoothing filter comprising:

compute means for receiving filter window size, number of filter directions and input data;

adaptive weighting parameter map means connected to said compute means;

adaptive weighting process means connected to said compute means and said adaptive weighting parameter map means; and, final compute means connected to said adaptive weighting process means for providing filtered output data.

2. An adaptive edge-preserving smoothing filter as claimed in claim 1 further comprising:

adaptive combination parameter map means connected between said compute means and said final compute means.

3. An adaptive edge-preserving smoothing filter as claimed in claim 1 wherein:

said compute means computes the directional mean values and corresponding variances for all directions.

4. An adaptive edge-preserving smoothing filter as claimed in claim 1 wherein:

said adaptive weighting parameter map means receives a constant weighting parameter, $\alpha$, which ensures that directional mean with smallest directional variance will always contribute a greatest amount of signal to said filtered output data.

5. An adaptive edge-preserving smoothing filter as claimed in claim 1 wherein:

said adaptive weighting parameter map means computes an adaptive weighting parameter map, $\alpha\_map$, from local directional means and variances obtained from said compute means.

6. An adaptive edge-preserving smoothing filter as claimed in claim 1 wherein:

adaptive weighting process means combines all directional means with their variances as weighting factors to form filtered data in which local directional means with smaller variances always have a greater contribution.

7. An adaptive edge-preserving smoothing filter as claimed in claim 1 wherein:

said final compute means adaptively combines input data and filtered data from said adaptive weighting process means.

8. An adaptive edge-preserving smoothing filter as claimed in claim 1 wherein:

for every small alpha, $\alpha$, said filter acts like an isotropic smoothing filter and for every large alpha, $\alpha$, said filter acts like an isotropic nonlinear smoothing filter.

9. An adaptive edge-preserving smoothing filter as claimed in claim 2 wherein:

said adaptive combination parameter map means receives a constant weighting parameter, $\beta$.

10. An adaptive edge-preserving smoothing filter as claimed in claim 2 wherein:

said adaptive combination parameter map means computes an adaptive combination parameter map, $\beta\_map$, from local directional means and variances obtained from said compute means.

11. An adaptive edge-preserving smoothing filter as claimed in claim 2 wherein:

adaptive weighting process means combines all directional means with their variances as weighting factors to form filtered data in which local directional means with smaller variances always have a greater contribution.

12. An adaptive edge-preserving smoothing filter as claimed in claim 2 wherein:

said final compute means adaptively combines input data and filtered data from adaptive weighting process means depending on value of combination parameter, $\alpha$, or adaptive combination parameter map, $\beta\_map$, obtained from said adaptive combination parameter map means.

13. An adaptive edge-preserving smoothing filter comprising:

compute means for receiving filter window size, number of filter directions and input data;

adaptive weighting process means connected to said compute means;

adaptive combination parameter map means connected to said compute means; and, final compute means connected to said adaptive weighting process means and said adaptive combination parameter map means for providing filtered output data.

14. An adaptive edge-preserving smoothing filter as claimed in claim 13 further comprising:

adaptive weighting parameter map means connected between said compute means and said adaptive weighting process means.

15. An adaptive edge-preserving smoothing filter as claimed in claim 13 wherein:

said compute means computes the directional mean values and corresponding variances for all directions.

16. An adaptive edge-preserving smoothing filter as claimed in claim 13 wherein:

said adaptive combination parameter map means receives a constant weighting parameter, $\beta$.

17. An adaptive edge-preserving smoothing filter as claimed in claim 13 wherein:

said adaptive combination parameter map means computes an adaptive combination parameter map, $\beta\_map$, from local directional means and variances obtained from said compute means.

18. An adaptive edge-preserving smoothing filter as claimed in claim 13 wherein:

adaptive weighting process means combines all directional means with their variances as weighting factors to form filtered data in which local directional means with smaller variances always have a greater contribution.

19. An adaptive edge-preserving smoothing filter as claimed in claim 13 wherein:

said final compute means adaptively combines input data and filtered data from adaptive weighting process means depending on value of combination parameter, $\beta$, or adaptive combination parameter map, $\beta\_map$, obtained from said adaptive combination parameter map means.

20. A method of performing adaptive edge-preserving filtering comprising the steps of:

receiving filter window size, number of filter directions and input data;

computing directional mean values and corresponding variances for all directions;

inputting or computing an adaptive weighting parameter map;

performing an adaptive weighting process;

inputting or computing an adaptive combination parameter map; and, computing final filter output based on said input data, result data from said adaptive weighting process and said adaptive combination parameter map.

* * * * *